(12) United States Patent
Guo et al.

(10) Patent No.: US 9,785,976 B2
(45) Date of Patent: Oct. 10, 2017

(54) SIMPLIFIED CREATION OF ADVERTISEMENTS FOR OBJECTS MAINTAINED BY A SOCIAL NETWORKING SYSTEM

(71) Applicant: Facebook, Inc., Menlo Park, CA (US)

(72) Inventors: Dong Guo, Milpitas, CA (US); Mark Kar Hong Wong, Redwood City, CA (US); William Schurman, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 357 days.

(21) Appl. No.: 14/102,794

(22) Filed: Dec. 11, 2013

(65) Prior Publication Data

US 2015/0161673 A1  Jun. 11, 2015

(51) Int. Cl.
G06Q 30/02 (2012.01)
G06Q 50/00 (2012.01)

(52) U.S. Cl.
CPC ..... *G06Q 30/0269* (2013.01); *G06Q 30/0277* (2013.01); *G06Q 50/01* (2013.01)

(58) Field of Classification Search
CPC .......................... G06Q 30/0276; G06Q 50/01
USPC ....................................................... 705/14.41
See application file for complete search history.

(56) References Cited

U.S. PATENT DOCUMENTS

2008/0040217 A1* 2/2008 Dellovo ............. G06Q 10/0637 705/14.41
2009/0216597 A1* 8/2009 Cavander ............... G06Q 10/00 705/7.12
2013/0275210 A1* 10/2013 Johnson ............. G06Q 30/0276 705/14.48

* cited by examiner

*Primary Examiner* — David Stoltenberg
*Assistant Examiner* — Robert C Johnson
(74) *Attorney, Agent, or Firm* — Fenwick & West LLP

(57) ABSTRACT

A social networking system generates an advertisement, a recommended budget, and recommended targeting criteria for an object maintained by the social networking system for presentation to social networking system users. Information associated with the object by the social networking system is used to generate elements of the advertisement, the recommended budget, and the recommended targeting criteria. Different budgets, each associated with a predicted return on investment, may be determined, allowing an advertiser to select a budget based on the return the advertiser receives from presentation of the advertisement. Additionally, an advertiser may modify the recommended targeting criteria, recommended budget, or elements of the generated advertisement to customize presentation or distribution of the advertisement.

21 Claims, 3 Drawing Sheets

SIMPLIFIED CREATION OF ADVERTISEMENTS FOR OBJECTS MAINTAINED BY A SOCIAL NETWORKING SYSTEM

BACKGROUND

This disclosure relates generally to social networking systems, and more specifically to creating advertisements for objects maintained by a social networking system.

A social networking system allows its users to connect to and communicate with other social networking system users. Users may create profiles on a social networking system that are tied to their identities and include information about the users, such as interests and demographic information. The users may be individuals or entities such as corporations or charities. Because of the increasing popularity of social networking systems and the increasing amount of user-specific information maintained by social networking systems, a social networking system provides an ideal forum for advertisers to increase awareness about products or services by presenting advertisements to social networking system users.

Presenting advertisements to social networking system users allows an advertiser to gain public attention for products or services or to persuade social networking system users to take an action regarding the advertiser's products or services. Many social networking systems generate revenue by displaying advertisements to their users. Frequently, social networking systems charge advertisers for each presentation of an advertisement to a social networking system user (e.g., each "impression" of the advertisement) or interaction with an advertisement by a social networking system user.

Conventional social networking systems provide an advertiser with an interface to specify information for generating one or more advertisements for presentation to social networking system users. Such an interface typically includes fields for an advertiser to provide information such as an image, a title, a body, a description, a budget, and one or more targeting criteria, to the social networking system for generating the advertisement. Optional fields may also be included in the interface, allowing an advertiser to specify additional information, such as audio data, video data, or other data, to be included in an advertisement. However, providing information to a social networking system to generate advertisements for advertisements through these interfaces often requires advertisers to expend significant resources to determine budgets and targeting criteria for advertisements and to become familiar with interfaces for providing information describing advertisements to a social networking system.

SUMMARY

To simplify creation of advertisements for objects maintained by a social networking system for presentation to social networking system users, a social networking system automatically generates an advertisement, recommended targeting criteria, and a recommended budget for an advertising campaign based on information associated with the object. For example, the advertisement, the recommended budget, and the recommended targeting criteria are generated when the social networking system receives a request to create an advertisement for an object from an advertiser. The advertisement may use the recommended budget and targeting criteria or may specify a budget and/or targeting criteria. In some embodiments, an advertiser may specify a goal associated with an advertisement. For example, an advertiser specifies a number of conversions associated with the advertisement within a certain time period. Additionally, the social networking system may provide an advertiser with various budgets for an advertisement generated for an object and provide the advertiser with a predicted return on investment (ROI) for each budget.

When the social networking system receives a request from an advertiser to create an advertisement for an object maintained by the social networking system, the social networking system retrieves information associated with the object to generate the advertisement. Information associated with the object includes a name, the type of object (e.g., page, group, event, application, etc.), a cover image, additional images, a description, a number of users or objects connected to the object, types of connections to the object, information associated with other objects connected to the object, a geographic location, an address for a destination internal to the SNS, metadata, posts, etc. Elements of the advertisement are generated from the retrieved information associated with the object. For example, a cover image for a page is selected for an image in an advertisement, and a description of the page is included as text of the advertisement. As an additional example, a number of users who have expressed a preference for a page for a candy store may be included an advertisement generated for the page along with the street address of the store. In some embodiments, one or more elements of the advertisement are determined based on an objective for the advertisement specified in the request received from the advertiser; for example, if the advertiser specifies a goal to increase a number of social networking system users indicating a preference for a page, an element allowing a user to indicate a preference for the page may be included in the advertisement.

Additionally, the social networking system determines recommended targeting criteria for the advertisement based on information associated with the object by the social networking system. In some embodiments, connections between the object and additional objects maintained by the social networking system or between the object and social networking system users are used to determine the recommended targeting criteria. For example, the recommended targeting criteria associated with an advertisement for a group maintained by the social networking system may be determined based on information maintained by the social networking system for users that are members of that group. In an embodiment, locations, interests, or other demographic information associated with a threshold number or percentage of social networking system users connected to an object are identified as recommended targeting criteria for an advertisement associated with the object. For example, a description identifying an event as a marathon to help raise money for breast cancer research is used to generate targeting criteria that will present an advertisement for the event to social networking system users who are members of groups associated with breast cancer research funding and who have profile information indicating an interest in running.

The recommended targeting criteria for an advertisement may also be determined based at least in part on keywords associated with the object being advertised (e.g., from metadata, posts, and a description associated with the object). For example, one or more keywords are identified from content associated with the object and included in targeting criteria of an advertisement for the object as interests of users eligible to be presented with the advertisement. Recommended targeting criteria of an advertisement for an object may also be based on connections between additional users and users having a connection to the object. For example, recommended targeting criteria identifies users connected to at least a threshold number of additional users connected to an object to receive an advertisement associated with the object. Advertisers may use the recommended targeting criteria determined by the social networking system, may specify their own targeting criteria, or may modify the recommended targeting criteria.

Various types of information associated with an object may be used to determine the recommended budget of an advertisement for an object maintained by the social networking system. In various embodiments, the recommended budget for an advertisement is determined determined based on a number of users connected to the object, a goal specified by an advertiser, a function, and/or a machine-learning model. For example, the size of the recommended budget is proportional to a number of users connected to the object, so objects connected to a larger number of users have larger budgets.

The recommended budget may also be based on a machine-learned model or other function. For example, a machine-learned model generates a budget of an advertisement for an object based on a combination of the number of users connected to the object when the advertisement is generated and a number of new connections between the object and social networking system users within a time period. As an additional example, a machine-learned model or other function determines a recommended budget for an advertisement for a page based on a number of social networking system users that have expressed a preference for the page, the targeting criteria for the advertisement, the amount of money the advertiser has spent in a past period of time on advertisements, and the past performance of advertisements for the page. An advertiser may modify the recommended budget or specify a budget different from the recommended budget.

Additionally, the social networking system may generate a predicted return on investment (ROI) associated with different budgets of an advertisement generated for an object. For example, the social networking system determines a number of social networking system users predicted to interact with or indicate a preference for the object per day, or predicted to perform any suitable rate of conversion events, after being presenting with an advertisement on the social networking system having a particular budget. An advertiser may modify the budget for the advertisement based on the predicted ROI associated with the budget. For example, if an advertisement for an object has a budget of $5.00 per day and the social networking system determines a ROI of 2-17 new social networking system users indicating a preference for the object per day, the advertiser may increase the budget associated with the advertisement to receive a determined ROI of at least 20 new users indicating a preference for the object per day

Figure 1:
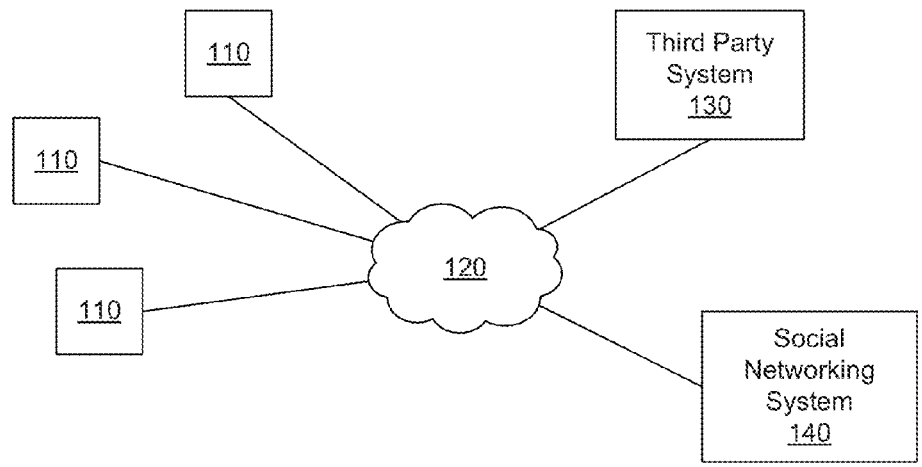
FIG. 1 is a block diagram of a system environment in which a social networking system operates, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
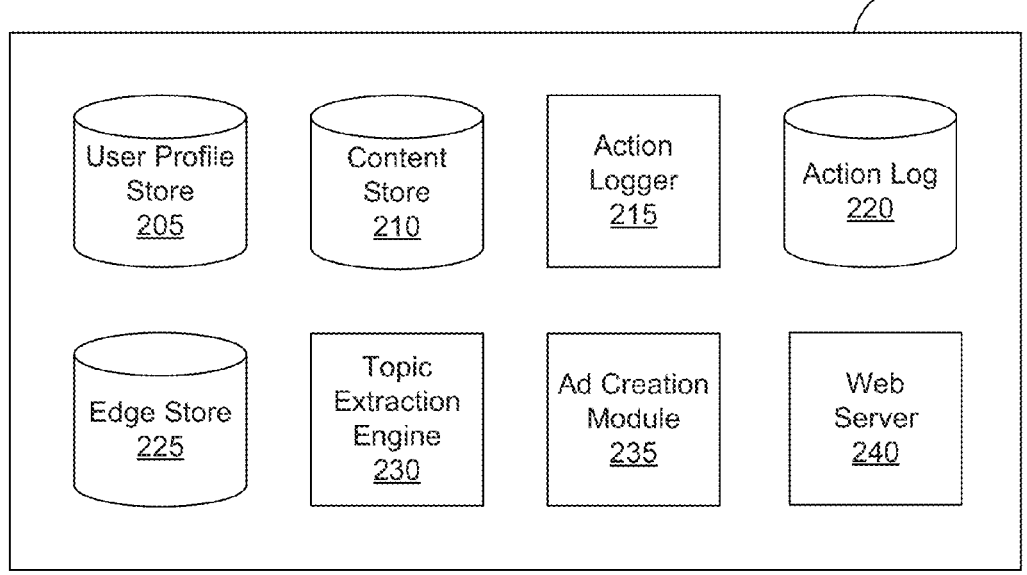
FIG. 2 is a block diagram of a social networking system, in accordance with an embodiment.

FIG. 2 is a block diagram of an architecture of the social networking system 140, which may be a social networking system in some embodiment. The social networking system 140 shown in FIG. 2 includes a user profile store 205, a content store 210, an action logger 215, an action log 220, an edge store 225, an advertisement ("ad") request store 230, an ad subsidization module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The social networking system 140 includes a topic extraction engine 230, which identifies one or more topics associated with objects in the content store 210. In one embodiment, the topic extraction engine 230 identifies anchor terms included in a content item and determines a meaning of the anchor terms to identify topics associated with content items, as further described in U.S. application Ser. No. 13/167,701, filed Jun. 24, 2011, which is hereby incorporated by reference in its entirety. For example, the topic extraction engine 230 determines one or more topics associated with a content item maintained in the content store 210. The one or more topics associated with a content item are stored and associated with an object identifier corresponding to the content item. In various embodiments, associations between object identifiers and topics are stored in the topic extraction engine 230 or in the content store 210 to simplify retrieval of one or more topics associated with an object identifier or retrieval of object identifiers associated with a specified topic. Structured information associated with a content item may also be used to extract a topic associated with the content item. As further described below in conjunction with FIG. 3, topics associated with a content item may be used to generate recommended targeting criteria for an advertisement generated from information associated with the content item.

The ad creation module 235 retrieves information associated with an object maintained by the social networking system 140 to be advertised. Information associated with the object may be retrieved from the content store 210, the action log 220, the edge store 225, or the user profile store 205. One or more privacy settings specified by users may regulate access by the ad creation module 235 to user profiles in the user profile store 205 of users connected to the object. Examples of retrieved information associated with an object include a name associated with the object, a type of object (e.g., page, group, event, application, etc.), a cover image (e.g., profile picture) or other images associated with the object, a description of the object, a number of users or additional objects connected to the object, types of connections to the object, information associated with users or other objects connected to the object, a geographic location associated with the object, a network address associated with the object, metadata associated with the object, and posts associated with the object.

Based on the retrieved information associated with the object, the ad creation module 235 generates an advertisement for the object. The advertisement includes various elements, such as a title, a body, an image, a description, a network address (e.g., a network address of the object). Values for different elements of the advertisement are determined from the retrieved information. For example, a cover image, a name, and a description of a page are used to generate an image, a title, and a body of an advertisement for the page, respectively. In some implementations, an advertisement may also include additional elements such as video data, audio data, etc. Additionally, an advertiser may customize one or more elements of an advertisement.

The ad creation module 235 also determines recommended targeting criteria for the advertisement based on the retrieved information associated with the object. Information associated with social networking system users connected to the object or otherwise associated with the object may be analyzed to determine the recommended targeting criteria for the advertisement. In one embodiment, additional objects connected to the object are identified and targeting criteria identifying users connected to at least one of the additional objects are generated. For example, when generating an advertisement for a page for a babysitting service, the ad creation module 235 identifies one or more children's clothing retailers connected to the page and generates targeting criteria identifying users connected to a page associated with at least one of the children's clothing retailers. Additionally, characteristics or actions of users connected to the object are analyzed to determine the recommended targeting criteria. In one embodiment, characteristics or actions common to a threshold number or percentage of users connected to the object are identified as recommended targeting criteria. For example, if at least a threshold number of users connected to the page for the babysitting service have expressed a preference for baby food, the recommended targeting criteria identifies users that have expressed a preference for baby food. As an additional example, based on a location associated with a page for a Chinese restaurant and actions performed by users connected to the page for the Chinese restaurant, the recommended targeting criteria for an advertisement for the page identifies users associated with a location within a threshold distance of the location associated with the page for the Chinese restaurant and who have expressed a preference for at least one additional Chinese restaurant to receive the advertisement.

In one embodiment, the recommended targeting criteria of an advertisement for an object specifies actions or types of connections between a user and another user or object of the social networking system 140 based on information associated with users connected to the object. The recommended targeting criteria may also specify actions between a user and objects performed external to the social networking system 140, such as on a third party system 130. For example, recommended targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine the criteria to identify users eligible to be presented with an advertisement. As another example, targeting criteria identifies users having a connection to another user or object or having a particular type of connection to another user or object.

Based on the retrieved information associated with an object the ad creation module 235 also determines a recommended budget of an advertisement for the object. The recommended budget for the advertisement may be determined based on a number of social networking system users or objects connected to the object being advertised when a request to generate the advertisement is received, a goal specified by an advertiser, a function, and/or a machine-learned model. For example, a function determines a recommended budget for an advertisement based on a number of users connected to an object being advertised and a goal for the advertisement specified by an advertiser. An example goal specified by an advertiser is a number of users establishing a connection to the object within a specific time interval. Alternatively, a machine-learned model may determine a recommended budget for an advertisement for an object based on information associated with the object, the targeting criteria for the advertisement, and/or information associated with the advertiser. For example, a machine-learned model generates a recommended budget for an advertisement for an object based on number of social networking system users connected to an object, the targeting criteria of the advertisement for the object, the amount of money the advertiser has previously spent on advertisements, and the performance of past advertisements for the object.

In some embodiments, the ad creation module 235 may predict a return on investment (ROI) associated with a recommended budget. A predicted ROI expresses the recommended budget as a function of a goal specified by an advertiser (e.g., an amount of money spent by the advertiser to obtain a predicted or specified number of interactions with the advertisement or object within a certain time period). For example, based on a number of social networking system users connected to an object, a budget of an advertisement for the object of $10 per day for 7 days, and the targeting criteria for the advertisement, the ad creation module 235 determines an expected number of additional social networking system users per day having a threshold likelihood of establishing a connection to the object after being presented with the advertisement.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that is stored in the content store 210. Additionally, the web server 240 may provide application programming interface (API) functionality to send data directly to native client device operating systems, such as IOS®, ANDROID™, WEBOS® or BlackberryOS.

Generating an Advertisement from Information Associated with an Object

In some embodiments, an advertiser may select an ad creation option in connection with a page or other object to be promoted. The social networking system 140 then automatically generates an advertisement, recommended targeting criteria, and a recommended budget for the promotion without needing further user intervention. Thus, an advertiser may easily create an advertising campaign including one or more advertisements with associated targeting criteria and budgets via the social networking system 140.

Figure 3:
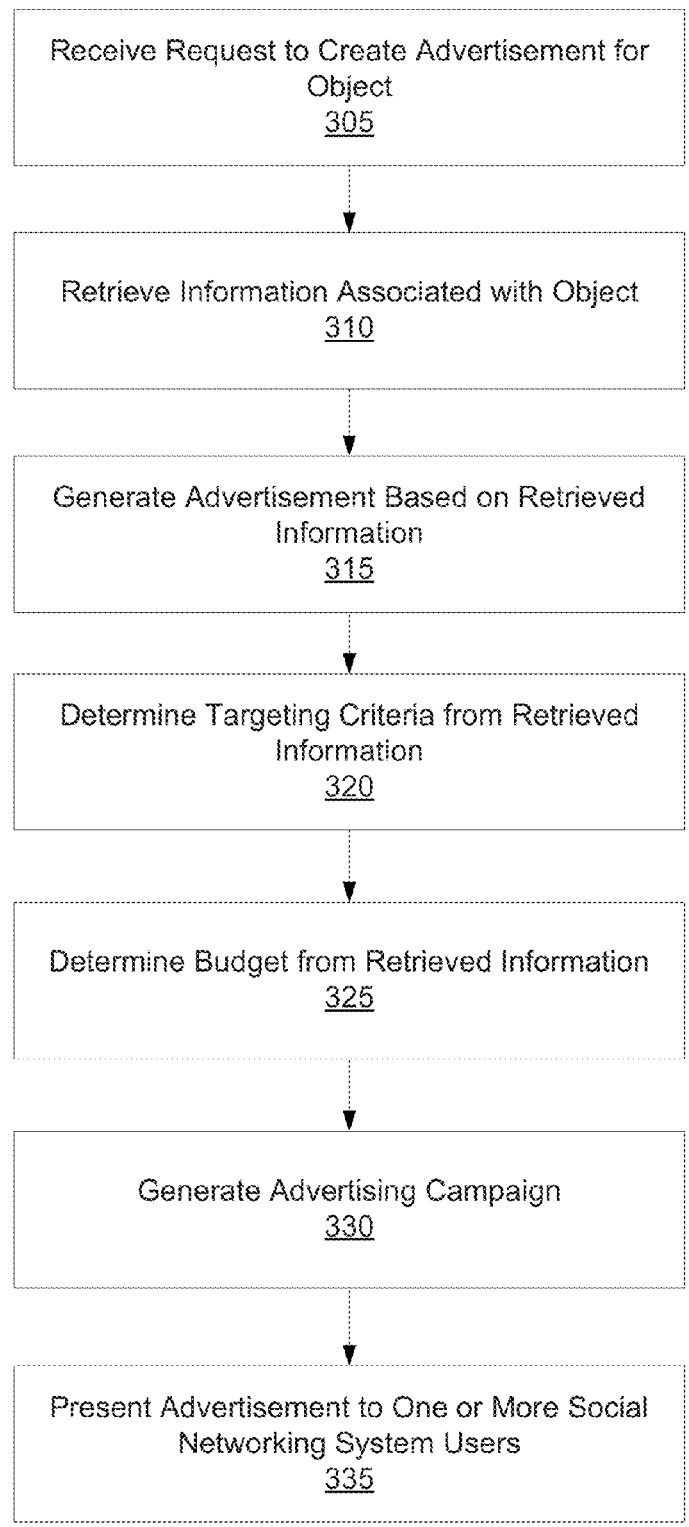
FIG. 3 is a flow chart of a method for generating an advertising campaign for an object maintained by a social networking system, in accordance with an embodiment.

FIG. 3 is a flow chart of one embodiment of a method for generating an advertisement for an object maintained by a social networking system 140. The social networking system 140 receives 305 a request from an advertiser to create an advertisement for an object maintained by the social networking system 140. The request includes information identifying the object, such as a object identifier associated with the object by the social networking system 140 or a network address associated with the object. The request may also include a type of conversion associated with the advertisement by the advertiser. A conversion is an interaction with the advertisement or with the object by a user of the social networking system 140. Examples of types of conversions include a user joining a group, a user installing an application, a user indicating a preference for an object (e.g., a user selecting a "like" option presented along with the object), a user installing an application that the user previously installed, a user sharing an object with one or more additional users, or any other suitable action. Types of conversions may be associated with types of objects. For example, an object that is an application is associated with conversions of installing the application, indicating a preference for the application, and sharing the application with another user, while an object that is a group is associated with conversions of joining the group and indicating a preference for the group.

The social networking system 140 retrieves 310 information it associates with the object identified by the request. The retrieved information includes various characteristics of the object. Example characteristics of the object include a name associated with the object (e.g., a business name associated with a page), a type associated with the object (e.g., page, group, event, application, etc.), one or more images associated with the object (e.g., profile image or cover image), text associated with the object (e.g., a description of the object), a number of social networking system users connected to the object, types of connections between users or additional objects and the object (e.g., members, administrators, etc.), information associated with other objects connected to the object, information used by the social networking system 140 to retrieve the object (e.g., a network address associated with the object), a geographic location associated with the object, metadata associated with the object (e.g., tags associated with photos on a page post), and information included in posts associated with the object.

Based on the retrieved information associated with the object, the social networking system 140 generates 315 an advertisement for the object. Elements of the advertisement for the object are generated 315 based on characteristics of the object identified from the retrieved information associated with the object. In one embodiment, the social networking system 140 maintains one or more rules associating different elements of an advertisement with one or more characteristics of an object. For example, an image in the advertisement is generated from one or more images associated with the object. As another example, a title of the advertisement is generated from a title of the object. In a specific example, an image of a business logo used as a cover image of the business's page on the social networking system 140 is used as an image in an advertisement for the page, while a description included in the advertisement is generated from the profile information associated with the page, and a link to the page is included as a destination associated with the advertisement. An element of the advertisement may be associated with characteristics of the object used to generate the element, allowing the element of the advertisement to be dynamically modified as the associated characteristics of the object change. For example, contact information included in an advertisement for a page is linked to profile information associated with the page, and the contact information included in the advertisement is modified when the profile information is modified, allowing the advertisement to present current information.

The social networking system 140 also determines 320 recommended targeting criteria associated with the advertisement for the object based on information associated with the object and/or information associated with social networking system users or other objects connected to the object. For example, keywords or phrases are extracted from text associated with the object (e.g., a description, a title, etc.) and used as recommended targeting criteria to identify users having a user profile with one or more of the keywords or phrases identified as interests to be presented with the advertisement. User profiles of one or more users connected to the object or otherwise associated with the object may also be analyzed, with interests or other characteristics included in at least a threshold number or percentage of user profiles identified as recommended targeting criteria of an advertisement for the object. Additional information included in user profiles of users connected to the object may be analyzed to determine 320 the recommended targeting criteria, with information included in a threshold number or percentage of user profiles identified as recommended targeting criteria. Examples of this additional information include demographic information (e.g., location, age, etc.) and/or actions (e.g., application installations, amount of money spent in an application, etc.) associated with users connected to the object.

A recommended budget for the advertisement is also determined 325 by the social networking system 140 based on information associated with the object. For example, a number of users connected to the object when the request is received 305 by the social networking system 140 is used to determine 325 the recommended budget. Additional information may also be used to determine 325 the recommended budget. For example, a goal specified by the advertiser, a specified function, and/or a machine-learned model are used to determine 325 the recommended budget. For example, if an object for which an advertisement is generated is an event, a recommended budget of the advertisement is determined 325 from a number of social networking system users who have indicated they will attend the event when the request to generate the advertisement was received 305, a number of users to indicate attendance of the event specified by the advertiser, and a function determines 325 the recommended budget from the number of users indicating they will attend the event and the specified number of users. As an additional example, a machine-learned model determines 325 a recommended budget for an advertisement for a page based on a number of social networking system users connected to the page, the targeting criteria for the advertisement, an amount of money the advertiser has previously spent on advertisements, and the performance of past advertisements for the page. In some embodiments, various budgets are determined 325 along with a predicted return on investment (ROI) associated with each budget. For example, a budget is indicated as a function of a goal specified by an advertiser (e.g., an amount of money spent by the advertiser per day to achieve a specified number of conversions each day). The advertiser may select a budget based in part on the ROI associated with the budget, allowing the advertiser to select a budget that best achieves the advertiser's goal for the budget. An advertisement campaign for the object is generated 330 when the social networking system 140 receives an indication that the advertiser has accepted the generated advertisement, the targeting criteria, the and budget. The indication received from the advertiser may modify the recommended targeting criteria, recommended budget, or one or more elements of the advertisement, allowing the advertiser to customize the advertisement that is generated 330.

Figure 4:
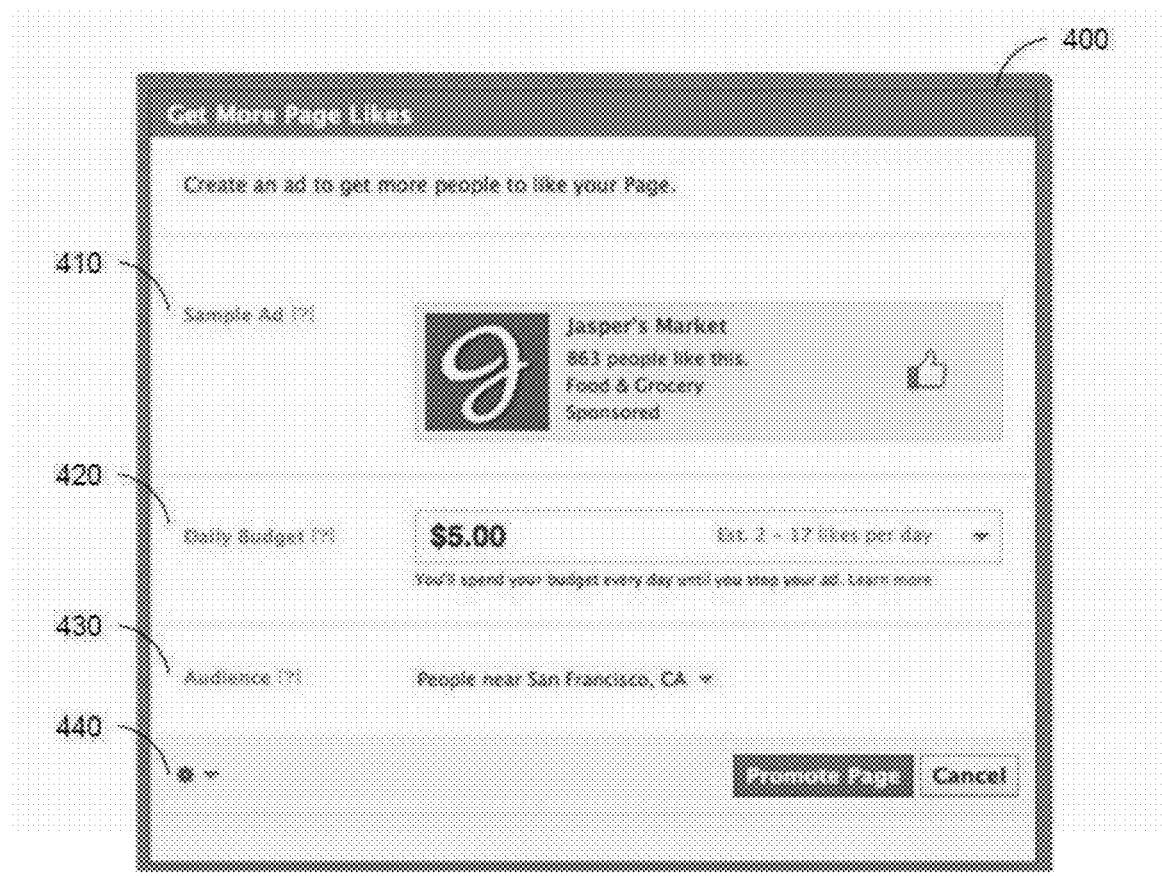
FIG. 4 is an example user interface for generating an advertising campaign within a social networking system, in accordance with an embodiment.

FIG. 4 shows an example of a user interface 400 presented to an advertiser for generating an advertisement associated with an object. In the example of FIG. 4, the user interface 400 includes various fields that include values determined from characteristics of the object. The user interface 400 may present a sample advertisement 410 including elements generated from characteristics of the object to be advertised. Additionally, the user interface 400 identifies a recommended budget 420 and recommended targeting criteria 430.

The user interface 400 allows an advertiser to accept, reject, or modify portions of an advertisement generated from characteristics of the object to be advertised by interacting with the user interface 400. For example, rather than using the cover image of a page as an image in an advertisement for the page, an advertiser identifies a different image from the page or from another source for inclusion in the advertisement. As an additional example, an advertiser modifies a recommended budget 420 of $5 per day to a budget of $10 per day. In various embodiments, the user interface 400 may include additional options 440 to further modify elements of the advertisement or presentation of the advertisement. For example, additional options allow an advertiser to specify types of client devices on which the advertisement is presented (e.g., mobile devices, desktop devices, etc.), locations in a display device in which the advertisement is presented (e.g., in a newsfeed of stories describing actions performed by social networking system users, adjacent to a newsfeed, as a banner advertisement, etc.). This provides an advertiser with increased ability to customize presentation of the advertisement.

Based on the generated advertising campaign, the generated advertisement may be presented 335 to social networking system users satisfying one or more of the targeting criteria. The generated advertisement is presented subject to the budget associated with the advertisement, so the budget affects the duration and number of times the generated advertisement is presented 335 to social networking system users. For example, an advertisement for a new game application with a budget of $1,000 is presented 335 to users between the ages of 10 and 60 who satisfy targeting criteria of having indicated a preference for a page for the game designer. If the goal of the advertisement is for users to install the game and an advertiser is charged $0.50 for each installation resulting from presenting 335 the advertisement on the social networking system 140, the advertisement is presented to users satisfying the targeting criteria until 2,000 installations of the game occur.

Summary

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving, at a social networking system, a request from an advertiser to generate an advertisement associated with an object of a plurality of objects maintained by the social networking system, the plurality of objects including at least one object representing a page post;
    retrieving, by the social networking system, information associated with the object;
    generating, by the social networking system, the advertisement based at least in part on the retrieved information associated with the object, one or more elements of the advertisement based at least in part on characteristics of the retrieved information associated with the object;
    determining, by the social networking system, targeting criteria for the advertisement based at least in part on the retrieved information associated with the object;
    determining, by the social networking system, a budget for the advertisement based at least in part on the retrieved information associated with the object;
    generating, by the social networking system, an advertising campaign including the advertisement associated with the object, the determined targeting criteria, and the determined budget; and
    presenting the advertisement associated with the object to one or more users of the social networking system based at least in part on the advertising campaign.

2. The method of claim 1, wherein determining, by the social networking system, the budget for the advertisement based at least in part on the retrieved information associated with the object comprises:
    determining a conversion goal associated with the advertisement from the received request.

3. The method of claim 2, wherein determining, by the social networking system, the budget for the advertisement based at least in part on the retrieved information associated with the object further comprises:
    determining an expected return on investment associated with the advertisement based at least in part on the conversion goal.

4. The method of claim 2, wherein determining, by the social networking system, the budget for the advertisement based at least in part on the retrieved information associated with the object further comprises:
    determining a number of connections between the object and one or more additional objects maintained by the social networking system based at least in part on the retrieved information associated with the object; and
    determining the budget for the advertisement using a function based at least in part on the determined number of connections between the object and the one or more additional objects and the conversion goal.

5. The method of claim 1, wherein determining, by the social networking system, the budget for the advertisement based at least in part on the retrieved information associated with the object further comprises:

determining a conversion goal associated with the advertisement from the received request;
generating a plurality of budget options associated with the advertisement based at least in part on the conversion goal and the retrieved information associated with the object; and
determining a return on investment for each of the plurality of budget options based at least in part on the conversion goal.

6. The method of claim 1, wherein determining, by the social networking system, the budget for the advertisement based at least in part on the retrieved information associated with the object comprises:
generating the budget by applying a machine learned model to at least a subset of the retrieved information associated with the object.

7. The method of claim 1, wherein determining, by the social networking system, the targeting criteria for the advertisement based at least in part on the retrieved information associated with the object comprises:
identifying users of the social networking system connected to the object;
retrieving user profiles associated with each of the identified users; and
identifying one or more characteristics included in at least a threshold number of the retrieved user profiles as targeting criteria.

8. The method of claim 1, wherein determining, by the social networking system, the targeting criteria for the advertisement based at least in part on the retrieved information associated with the object comprises:
identifying users of the social networking system connected to the object;
retrieving user profiles associated with each of the identified users; and
identifying one or more characteristics included in at least a threshold percentage of the retrieved user profiles as targeting criteria.

9. The method of claim 1, wherein determining, by the social networking system, the targeting criteria for the advertisement based at least in part on the retrieved information associated with the object comprises:
determining one or more keywords from the retrieved information associated with the object.

10. The method of claim 1, wherein the information associated with the object maintained by the social networking system is selected from a group consisting of: text, an image, a name, a type of object, a number of users of the social networking system connected to the object, a type of connection to the object, information associated with one or more additional objects maintained by the social networking system connected to the object, a network address associated with the object, a geographic location, metadata, information posted by one or more users of the social networking system, and any combination thereof.

11. The method of claim 1, wherein an element of the advertisement is linked to the retrieved information associated with the object so the element is modified when the retrieved information to which it is linked is modified.

12. A computer program product comprising a non-transitory computer-readable storage medium having instructions encoded thereon that, when executed by a processor, cause the processor to:
receive, at a social networking system, a request from an advertiser to generate an advertisement associated with an object of a plurality of objects maintained by the social networking system, the plurality of objects including at least one object representing a page post:
retrieve, by the social networking system, information associated with the object;
generate, by the social networking system, the advertisement based at least in part on the retrieved information associated with the object, one or more elements of the advertisement based at least in part on characteristics of the retrieved information associated with the object;
determine, by the social networking system, targeting criteria for the advertisement based at least in part on the retrieved information associated with the object;
determine, by the social networking system, a budget for the advertisement based at least in part on the retrieved information associated with the object;
generate, by the social networking system, an advertising campaign including the advertisement associated with the object, the determined targeting criteria, and the determined budget; and
present the advertisement associated with the object to one or more users of the social networking system based at least in part on the advertising campaign.

13. The computer program product of claim 12, wherein determine, by the social networking system, the budget for the advertisement based at least in part on the retrieved information associated with the object comprises:
determine a conversion goal associated with the advertisement from the received request; and
determine an expected return on investment associated with the advertisement based at least in part on the conversion goal.

14. The computer program product of claim 13, wherein determine, by the social networking system, the budget for the advertisement based at least in part on the retrieved information associated with the object comprises:
determine a number of connections between the object and one or more additional objects maintained by the social networking system based at least in part on the retrieved information associated with the object; and
determine the budget for the advertisement using a function based at least in part on the determined number of connections between the object and the one or more additional objects and the conversion goal.

15. The computer program product of claim 12, wherein determine, by the social networking system, the budget for the advertisement based at least in part on the retrieved information associated with the object comprises:
generate the budget by applying a machine learned model to at least a subset of the retrieved information associated with the object.

16. The computer program product of claim 12, wherein determine, by the social networking system, the targeting criteria for the advertisement based at least in part on the retrieved information associated with the object comprises:
identify users of the social networking system connected to the object;
retrieve user profiles associated with each of the identified users; and
identify one or more characteristics included in at least a threshold number of the retrieved user profiles as targeting criteria.

17. The computer program product of claim 12, wherein determine, by the social networking system, the targeting criteria for the advertisement based at least in part on the retrieved information associated with the object comprises:
identify users of the social networking system connected to the object;

retrieve user profiles associated with each of the identified users; and identify one or more characteristics included in at least a threshold percentage of the retrieved user profiles as targeting criteria.

18. The computer program product of claim 12, wherein determine, by the social networking system, the targeting criteria for the advertisement based at least in part on the retrieved information associated with the object comprises:

determine one or more keywords from the retrieved information associated with the object.

19. The computer program product of claim 12, wherein the information associated with the object maintained by the social networking system is selected from a group consisting of: text, an image, a name, a type of object, a number of users of the social networking system connected to the object, a type of connection to the object, information associated with one or more additional objects maintained by the social networking system connected to the object, a network address associated with the object, a geographic location, metadata, information posted by one or more users of the social networking system, and any combination thereof.

20. The computer program product of claim 12, wherein an element of the advertisement is linked to the retrieved information associated with the object so the element is modified when the retrieved information to which it is linked is modified.

21. The computer program product of claim 12, wherein the computer-readable storage medium further has instructions encoded thereon that, when executed by the processor, cause the processor to:

receive an input specifying one or more components of the advertising campaign for the object to modify; and modify the specified one or more components of the advertisement campaign based at least in part on the received input.

* * * * *